Figure 1:
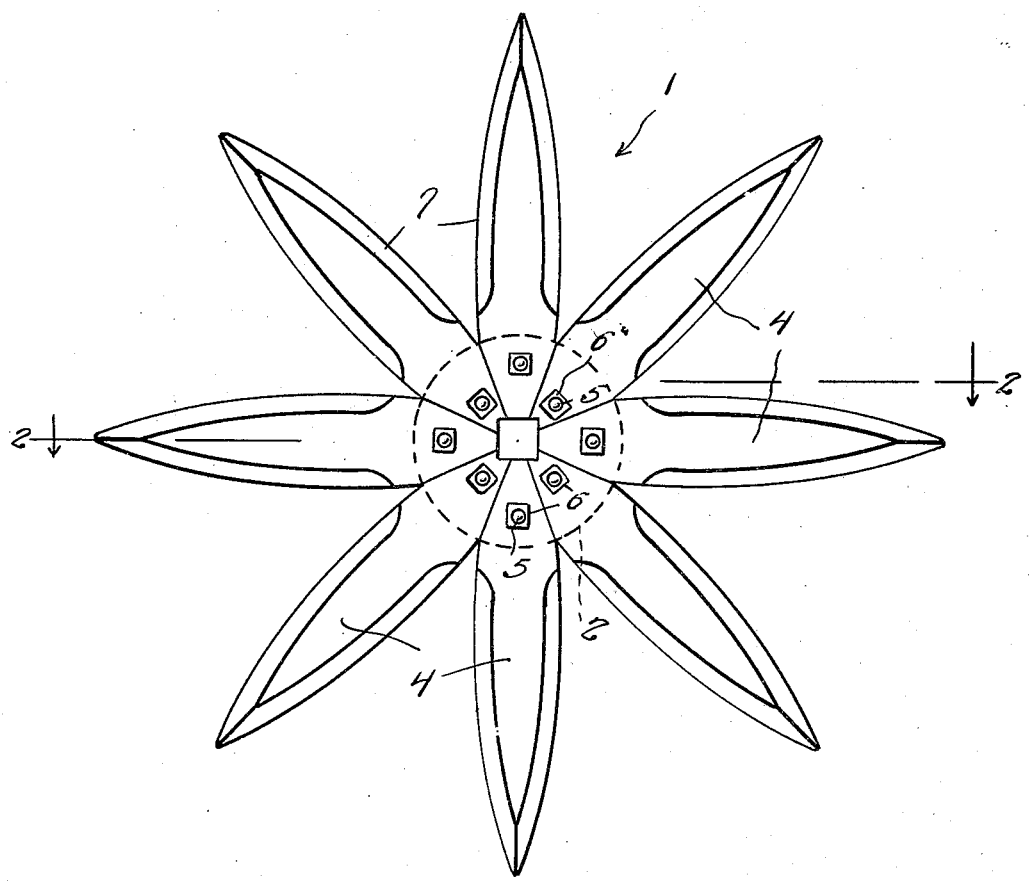

Nov. 26, 1929.  E. R. SEITZ  1,737,179
ROTARY PICK PLOW
Filed Jan. 28, 1928

Inventor
E. R. Seitz,

By Clarence A. O'Brien
Attorney

Patented Nov. 26, 1929

1,737,179

UNITED STATES PATENT OFFICE

ELI ROY SEITZ, OF STERLING, KANSAS

ROTARY PICK PLOW

Application filed January 28, 1928. Serial No. 250,123.

The present invention relates to improvements in earth working implements and has reference more particularly to a rotary pick plow that will penetrate the soil to a considerable depth and will break, loosen, and disintegrate the same.

One of the important objects of the present invention is to provide a structure that includes a disc and a series of radially disposed blades secured at their inner ends to the disc, the blades being curved longitudinally and being sharpened along their side edges.

A still further object is to provide a rotary pick plow which is simple in construction, inexpensive, strong and durable and further well adapted to the purpose for which it is designed.

Other objects and advantages of the invention will become apparent during the course of the following description when taken in connection with the accompanying drawing.

Figure 2:
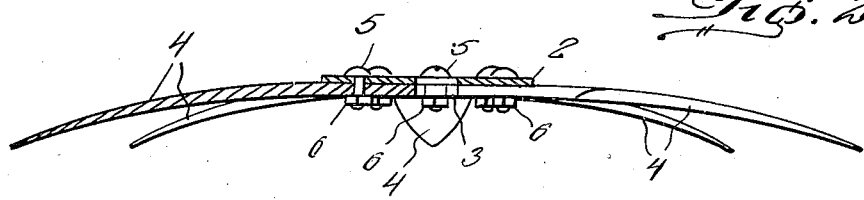

In the accompanying drawing wherein like reference characters indicate corresponding parts through the several views:

Figure 1 is a side elevation of the rotary pick plow embodying my invention, and Figure 2 is a sectional view taken substantially on the line 2—2 of Figure 1.

In the drawing wherein for the purpose of illustration is shown the preferred embodiment of my invention, the numeral 1 designates generally the plow unit, the same including a flat metallic disc 2 that is formed with a central substantially rectangular shaped opening 3 in order to permit the same to be mounted on a shaft, not shown, for rotation therewith.

A series of radially disposed earth engaging blades or teeth designated by the numeral 4 are adapted to be secured at their inner ends on one side face of the disc 2 and to this end, the inner end of this blade is flat for flush engagement against the face of the disc 2 in the manner as clearly shown in Figure 2, and furthermore the inner ends of the radially disposed blades or teeth are so cut as to permit the same to be disposed in abutting relation with respect to each other as disclosed in Figure 1. A bolt or rivet 5 extends through the inner end of each blade or tooth and through the disc and a nut 6 is threaded on the threaded end of each bolt for providing a rigid connection between the inner ends of the radially disposed blades or teeth and the flat disc 2.

It will also be observed from the construction shown in Figure 1, that the inner extremities of the blades terminate at the side edges of the rectangular opening 3 formed centrally in the disc 2 and certain of the blades or teeth are notched at their inner extremities to form a substantially rectangular shaped opening at the center of said blade. The opening thus formed by the inner extremities of the blades will register with the openings 3 formed in the disc 2.

Each of the blades or teeth is curved along its longitudinal axis from the flattened inner end portion to the outer extremities thereof, and furthermore the side edges of the blades are also curved. Furthermore the side edges of each blade or tooth are sharpened as indicated at 7.

The blades or teeth may be of any desirable length and furthermore any number of these teeth may be employed as is desired or necessary.

The provision of a structure of the above mentioned character will enable the teeth to penetrate the soil to a considerable depth for the purpose of breaking, loosening and disintegrating the same.

The simplicity of my improved construction enables the same to be readily and easily assembled or disassembled, and the teeth can be removed for resharpening the cutting edges thereof or whenever it is necessary to replace a broken tooth.

While I have shown the preferred embodiment of my invention it is to be understood that minor changes in the size, shape and arrangement of parts may be resorted to without departing from the spirit and scope of the appended claim.

Having thus described the invention, what I claim as new and desire to secure by Letters Patent is:—

In a rotary pick plow of the class described, a disk, a series of radially disposed blades, the inner end portion of each blade being tapered, each of said blades being curved longitudinally from the tapered inner end portion thereof to its outer end, the curved edges of each blade being curved and sharpened, the tapered inner ends of the blades being tapered transversely and disposed in edge to edge relation, said blades being secured to the disks at their inner end portions, certain of said blades having their inner ends notched to form the corners for a square opening, the sides of which are formed by the evenly cut inner ends of the remaining blades.

In testimony whereof I affix my signature.

ELI ROY SEITZ.